(12) United States Patent
Yamamoto et al.

(10) Patent No.: US 11,230,254 B2
(45) Date of Patent: Jan. 25, 2022

(54) GAS GENERATOR AND CONTAINER

(71) Applicant: DAICEL CORPORATION, Osaka (JP)

(72) Inventors: Koji Yamamoto, Tatsuno (JP); Mikio Yabuta, Tatsuno (JP)

(73) Assignee: DAICEL CORPORATION, Osaka (JP)

( * ) Notice: Subject to any disclaimer, the term of this patent is extended or adjusted under 35 U.S.C. 154(b) by 82 days.

(21) Appl. No.: 16/614,010

(22) PCT Filed: Mar. 5, 2018

(86) PCT No.: PCT/JP2018/008364
§ 371 (c)(1),
(2) Date: Nov. 15, 2019

(87) PCT Pub. No.: WO2018/211783
PCT Pub. Date: Nov. 22, 2018

(65) Prior Publication Data
US 2020/0061566 A1 Feb. 27, 2020

(30) Foreign Application Priority Data

May 18, 2017 (JP) .............................. JP2017-099342

(51) Int. Cl.
*B60R 21/264* (2006.01)
*B01J 7/00* (2006.01)

(52) U.S. Cl.
CPC ............... *B60R 21/264* (2013.01); *B01J 7/00* (2013.01)

(58) Field of Classification Search
CPC .... B60R 21/2644; B60R 21/264; B60R 21/26
See application file for complete search history.

(56) References Cited

U.S. PATENT DOCUMENTS 6,997,477 B2 * 2/2006 Quioc ................. B60R 21/2644
280/736
7,172,214 B2 * 2/2007 Matsuda ............ B01D 46/2403
280/741

(Continued)

FOREIGN PATENT DOCUMENTS

DE 19918401 A1 * 1/2000 ........... B60R 21/264
EP 1564087 A1 * 8/2005 ......... B60R 21/2644

(Continued)

OTHER PUBLICATIONS

Written Opinion of the International Searching Authority and International Search Report, dated May 22, 2018, along with an English translation.

*Primary Examiner* — Nicole T Verley
(74) *Attorney, Agent, or Firm* — Birch, Stewart, Kolasch & Birch, LLP

(57) ABSTRACT

The gas generator includes an igniter, a container including a container body and a lid formed relative to the container body and configured to contain a transfer charge and a housing configured to contain the igniter and the container, a predetermined region in the housing adjacent to the lid of the container being filled with a gas generating agent to be burned by a combustion product of the transfer charge burned by actuation of the igniter. The lid includes a frangible section configured to be capable of being ruptured by pressure applied by a combustion product generated by combustion of the transfer charge and a strong connection section configured to be capable of maintaining a connected state with the container body even in a case that pressure is applied by the combustion product.

9 Claims, 11 Drawing Sheets

(56) References Cited

U.S. PATENT DOCUMENTS

| | | | |
|---|---|---|---|
| 8,556,294 B1 * | 10/2013 | Norman, III | B60R 21/263 |
| | | | 280/741 |
| 8,656,838 B1 * | 2/2014 | Mayville | C06D 5/00 |
| | | | 102/530 |
| 8,740,245 B2 * | 6/2014 | Fukawatase | B60R 21/2644 |
| | | | 280/741 |
| 8,893,622 B2 * | 11/2014 | Jackson | B60R 21/2644 |
| | | | 102/530 |
| 2002/0175509 A1 * | 11/2002 | Iwai | B60R 21/2644 |
| | | | 280/741 |
| 2003/0137138 A1 | 7/2003 | Nakashima et al. | |
| 2014/0054881 A1 | 2/2014 | Fukawatase et al. | |

FOREIGN PATENT DOCUMENTS

| | | | | |
|---|---|---|---|---|
| JP | 2001-88653 A | 4/2001 | | |
| JP | 2001-225711 A | 8/2001 | | |
| JP | 2001-354105 A | 12/2001 | | |
| JP | 3387042 B2 * | 3/2003 | | |
| JP | 2007-131254 A | 5/2007 | | |
| WO | WO-02051673 A1 * | 7/2002 | | B60R 21/2644 |
| WO | WO 2012/153427 A1 | 11/2012 | | |
| WO | WO-2019230503 A1 * | 12/2019 | | B01J 7/00 |

\* cited by examiner

GAS GENERATOR AND CONTAINER

FIELD

The present invention relates to a gas generator that generates combustion gas by burning a gas generating agent by actuation of an igniter.

BACKGROUND

In a gas generator that burns a gas generating agent with which a combustion chamber is filled by actuation of an igniter and generates combustion gas, it is difficult to generate the combustion gas as designed in a case that the gas generating agent with which the combustion chamber is filled does not burn as desired. In general, to make the gas generating agent burn without unevenness and generate combustion gas as designed, the gas generating agent is uniformly disposed around the igniter. However, the configuration of the gas generator may make it difficult to uniformly dispose the gas generating agent around the igniter. For example, in a gas generator described in Patent Document 1, a first combustion chamber has an annular shape similar to a crescent and is filled with a first gas generating agent, and an igniter is disposed at the substantial center of the combustion chamber, as illustrated in FIG. 1 and FIG. 2. In such a configuration, an orientation of a transfer hole provided in an inner cylindrical member disposed surrounding the igniter is set in a direction along a peripheral wall of the combustion chamber in an attempt to regulate a direction of a flame associated with combustion of the igniter and achieve uniform combustion of the gas generating agent.

Further, Patent Document 2 discloses an upper/lower type gas generator having a structure in which combustion chambers are layered in an axial direction. In such an upper/lower type gas generator, two igniters corresponding to each combustion chamber are used. However, the two igniters are disposed on a bottom surface side of a housing of the gas generator, making it difficult to achieve a uniform positional relationship about the igniter between the igniter corresponding to the upper combustion chamber and the gas generating agent with which the upper combustion chamber is filled, in particular.

CITATION LIST

Patent Document

[Patent Document 1] JP 2001-225711 A
[Patent Document 2] JP 2001-354105 A
[Patent Document 3] JP 2007-131254 A

SUMMARY

Technical Problem

In a case that a gas generating agent with which a combustion chamber is filled is burned by actuation of an igniter in a gas generator, preferably the gas generating agent is disposed uniformly around the igniter to achieve combustion of the gas generating agent without unevenness. However, depending on the structure of the gas generator, it may be difficult to thus dispose the igniter in a position suitable for uniform combustion relative to the gas generating agent. For example, the igniter may need to be disposed at a position shifted from the gas generating agent due to restrictions on the shape or dimensions of the gas generator.

The configuration employed with the gas generator described above is a configuration in which the orientation of the transfer hole provided in the inner cylindrical member is aligned with a direction extending along the peripheral wall of the combustion chamber, leaving room for improvement in achieving uniform combustion of the gas generating agent in a case that the arrangement of the igniter is shifted from a position suitable for uniform combustion of the gas generating agent.

In light of the problems described above, an object of the present invention is to provide a technique that makes it possible to achieve uniform combustion of a gas generating agent regardless of an arrangement of an igniter in a gas generator.

Solution to Problem

To solve the above problems, a container according to an embodiment of the present invention is configured to contain a transfer charge and formed in such a way that the container is positioned relative to an igniter disposed in a housing of a gas generator, a lid of the container is ruptured by actuation of the igniter, and a combustion product thus generated is discharged by the lid in a predetermined direction that allows favorable combustion of a gas generating agent. According to such a configuration, it is possible to define a favorable start area for combustion of the gas generating agent regardless of the structure of the gas generator.

Specifically, according to an embodiment of the present invention, a gas generator includes an igniter; a container including a container body and a lid formed relative to the container body and configured to contain a transfer charge, the container being positioned relative to the igniter to allow combustion of the transfer charge by actuation of the igniter disposed outside the container; and a housing configured to contain the igniter and the container, wherein a predetermined region in the housing adjacent to the lid of the container is filled with a gas generating agent to be burned by a combustion product of the transfer charge burned by actuation of the igniter. The lid includes a frangible section configured to be capable of being ruptured by pressure applied by a combustion product generated by combustion of the transfer charge and a strong connection section configured to be capable of maintaining a connected state with the container body even in a case that pressure is applied by the combustion product. The lid is configured such that, in a case that the transfer charge is burned by actuation of the igniter, the frangible section is ruptured, and a portion or an entirety of the lid in a state of being connected to the container body with the strong connection section regulates discharge of the combustion product generated by the combustion of the transfer charge in a direction toward a predetermined combustion start area of the gas generating agent with filled in the housing.

In the gas generator according to an embodiment of the present invention, the housing is filled with the gas generating agent, and the igniter and the container are disposed in the housing. The positional relationship between the igniter and the container in the housing is determined in such a way that the transfer charge contained in the container is burned in a case that the igniter is actuated. At this time, the lid of the container is adjacent to the gas generating agent filled in a predetermined region of the housing. Thus, in a case that the transfer charge in the container is burned, the combustion product ruptures the lid of the container, is discharged through the ruptured portion, and comes into contact with the gas generating agent, causing the gas generating agent to burn. Then, combustion gas is generated by the combustion of the gas generating agent. Thus, in the gas generator described above, actuation of the igniter causes the gas generating agent in the housing to be burned ultimately through combustion of the transfer charge in the container. Here, the transfer charge may be another gas generating agent contained separately from the above-mentioned gas generating agent in the housing, or may be an explosive such as black gunpowder in the related art.

Here, the lid of the container is provided with the frangible section and the strong connection section. The frangible section is an area that can be preferentially ruptured by pressure inside the container in a case that the pressure rises due to combustion of the transfer charge, and is, for example, an area formed into a groove shape and having a wall thickness thinner than that of other areas of the lid. On the other hand, the strong connection section is an area having a strength sufficient enough to maintain connection with the container body even in a case where the strong connection section is exposed to pressure during combustion. Accordingly, with the lid including such a frangible section and a strong connection section, in a case that the transfer charge is burned, the lid deforms due to the breaking of the frangible section, is maintained in a state of connection to the container body by the strong connection section, and is not scattered in the housing. Thus, in a case that the combustion product of the transfer charge is discharged from the container, a portion or the entirety of the lid connected to the container body may serve as a resistance member or a guide member with respect to the discharge of the combustion product. That is, a portion or the entirety of the lid connected to the container body has the function of regulating a flow of the combustion product flowing out from the container.

Here, in a case that the transfer charge burns due to actuation of the igniter, a portion or the entirety of the lid connected to the container body described above is configured to regulate the discharge of the combustion product generated by the combustion of the transfer charge in a direction toward a predetermined combustion start area of the gas generating agent in the housing. The predetermined combustion start area is an area that serves as the origin of combustion of the gas generating agent for uniformly burning the gas generating agent filled in the housing and may be set as appropriate in accordance with a filling mode of the gas generating agent in the housing. By employing such a configuration, it is possible to direct the combustion product of the transfer charge toward an area suitable for combustion of the gas generating agent, regardless of the arrangement of the igniter in the housing.

Here, in the gas generator described above, as the combustion of the transfer charge proceeds, a discharge opening of the combustion product of the transfer charge formed by the portion or the entirety of the lid may be configured to increase in size. In this case, during a predetermined combustion period in a combustion process of the transfer charge, the combustion product of the transfer charge is guided to the predetermined combustion start area by the portion or the entirety of the lid. The predetermined combustion period is a period in which the amount of the combustion product of the transfer charge increases to a degree that determines the start of combustion of the gas generating agent in the combustion process of the transfer charge. With the combustion product thus guided to the predetermined combustion start area of the gas generating agent during the predetermined combustion period of the transfer charge, the combustion can be started in a way that allows uniform combustion of the gas generating agent.

In the gas generator described above, the lid may further include a through hole provided to allow a portion of the combustion product of the transfer charge burned by actuation of the igniter to reach an additional combustion area different from the predetermined combustion start area of the gas generating agent filled in the housing and positioned on a backside of the lid. In this way, the through hole allows a portion of the combustion product of the transfer charge to reach the gas generating agent positioned in the additional combustion area on the backside of the lid as well. This can favorably burn a portion of the gas generating agent in a position where combustion is inhibited when the combustion of the gas generating agent is started from the combustion start area because the portion of the gas generating agent is positioned on the backside of the lid. As a result, the gas generating agent can be favorably burned in the housing, and combustion unevenness can be suppressed. Note that by making the amount of the combustion product fed to the additional combustion area less than the amount of the combustion product fed directly to the combustion start area, the gas generating agent in the additional combustion area is supplementally ignited relative to the gas generating agent in the combustion start area.

In the gas generator described above, the igniter may be disposed on a bottom surface side of the housing. The housing may include a partition wall member provided such that the partition wall member surrounds the igniter and contains the igniter in the partition wall member, and such that the partition wall member includes an opening toward the gas generating agent filled in the housing. The container may be disposed, in an interior of the partition wall member, with a bottom side thereof adjacent to the igniter, a peripheral wall thereof facing an inner wall surface of the partition wall member, and the lid being configured to be oriented toward the gas generating agent through the opening of the partition wall member. In this way, the igniter and the container are positioned in such a way that the bottom side of the container is adjacent to the igniter with the peripheral wall of the container facing the inner wall surface of the partition wall member. This can favorably burn the transfer charge in the container by actuation of the igniter. Then, by guiding the combustion product of the transfer charge toward the gas generating agent in the housing by the lid deformed as described above through the opening of the partition wall member, actuation of the igniter can cause the gas generating agent to be burned from the predetermined combustion start area suitable for uniform combustion.

Note that, in the gas generator described above, the partition wall member may be configured to divide an internal space of the housing into an upper space and a lower space. Then, a space inside the upper space on an upper side of the igniter disposed on the bottom surface side of the housing is filled with the gas generating agent, and another igniter different from the igniter is disposed on the bottom surface side of the housing in the lower space, and the lower space is filled with another gas generating agent different from the gas generating agent and configured to be burned by actuation of the other igniter. That is, the gas generator is formed by overlapping the spaces (upper space and lower space) serving as a combustion chamber in the height direction thereof, and is configured to allow an increase in output of the gas generator while suppressing the surface area of the gas generator.

In a gas generator having such a configuration, while two igniters are disposed on the bottom surface side of the housing, the spaces (upper space and lower space) filled with the gas generating agent corresponding to each igniter are formed overlapping in the height direction of the gas generator, and thus the igniter corresponding to the gas generating agent filled in the upper space may be disposed in a shifted position relative to the gas generating agent. By applying the invention of the present application to a gas generator having such a configuration, it is possible to more favorably burn the gas generating agent without unevenness.

The invention of the present application can also be considered in an aspect of a container. That is, a container according to the invention of the present application is configured to contain a transfer charge, and includes a container body and a lid formed relative to the container body. The transfer charge contained is burned by actuation of an igniter disposed outside the container. The lid includes a frangible section configured to be capable of being ruptured by pressure applied by a combustion product generated by combustion of the transfer charge and a strong connection section configured to be capable of maintaining a connected state with the container body even in a case that pressure is applied by the combustion product. The lid is configured such that, in a case that the transfer charge is burned by actuation of the igniter, the frangible section is ruptured and a portion or an entirety of the lid is in a state of being connected to the container body with the strong connection section regulates discharge of the combustion product generated by combustion of the transfer charge in a direction toward a predetermined combustion start area of the gas generating agent positioned outside the container and different from the transfer charge. By applying such a container to a gas generator, it is possible to achieve uniform combustion of the gas generating agent filled in the gas generator regardless of the arrangement of the igniter in the gas generator.

Advantageous Effects of Invention

According to the present invention, it is possible to achieve uniform combustion of a gas generating agent regardless of an arrangement of an igniter in a gas generator.

DESCRIPTION OF EMBODIMENTS

A gas generator and a container incorporated in the gas generator according to embodiments of the present invention are described below with reference to the drawings. Note that the configuration of the following embodiments is exemplary, and the present invention is not limited to the configuration of these embodiments.

Example 1

Figure 1:
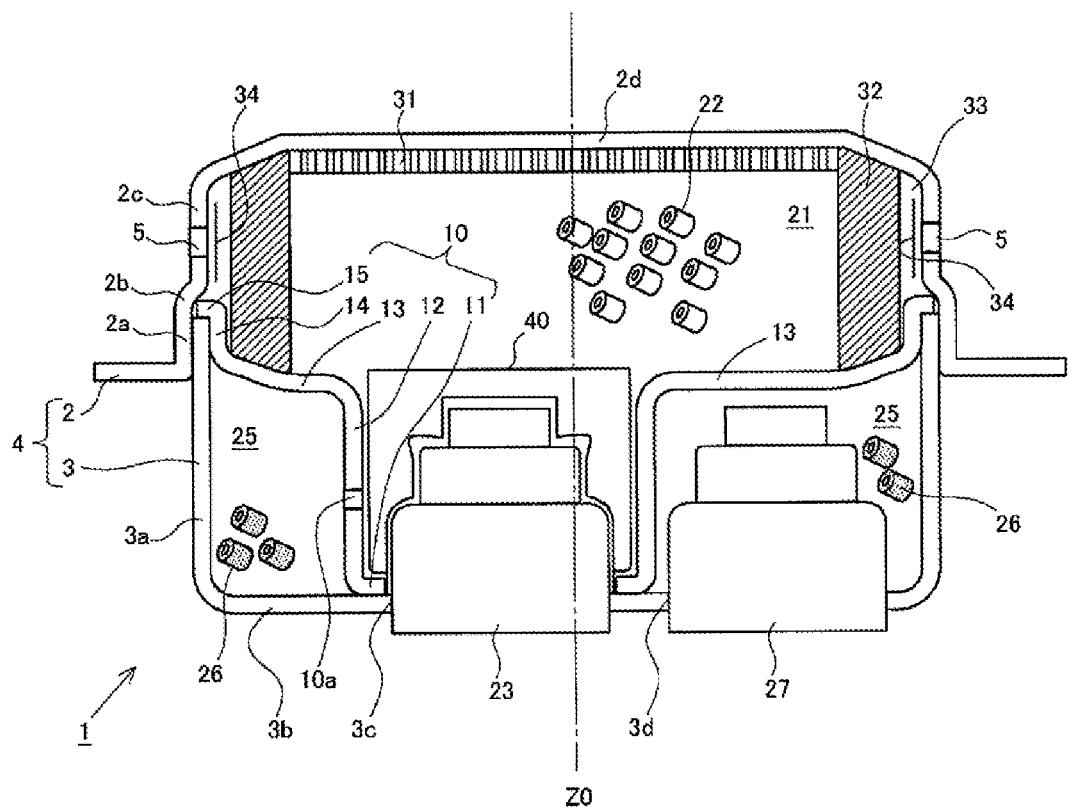
FIG. 1 is a first drawing illustrating a schematic configuration of a gas generator according to an embodiment of the present invention.
Figure 2:
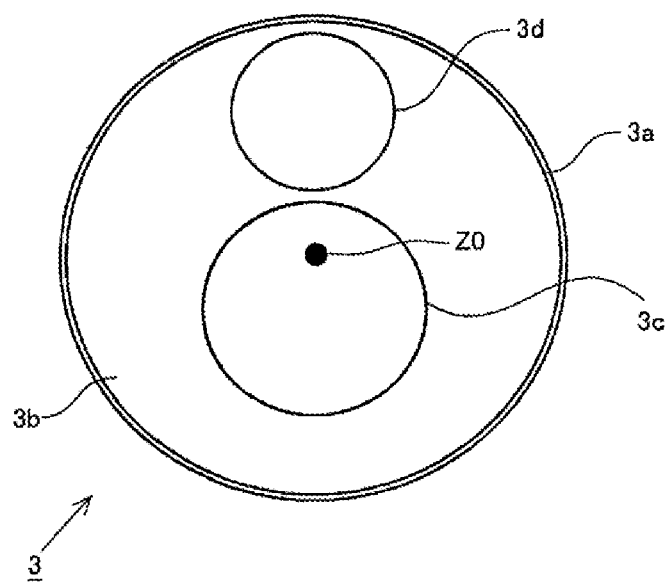
FIG. 2 is a top view of a lower shell incorporated into the gas generator illustrated in FIG. 1.

FIG. 1 is a cross-sectional view of a gas generator 1 in a height direction, and FIG. 2 is a top view of a lower shell 3 included in the gas generator 1. Note that Z0 in both drawings represents a center axis in the height direction (axial direction) of the gas generator 1. The gas generator 1 is configured to burn a gas generating agent with which a housing 4 formed by an upper shell 2 and a lower shell 3 is filled and to discharge a combustion gas. The upper shell 2 includes a peripheral wall 2c and a top surface 2d, which form an internal space having a concave shape. The top surface 2d and a bottom surface 3b of the lower shell 3 described below, have a substantially circular shape in a top view, and the peripheral wall 2c and a peripheral wall 3a of the lower shell 3 described below surround the top surface 2d and the bottom surface 3b, respectively, and form a wall surface having an annular shape and extending substantially vertically from each surface. The internal space of the upper shell 2 is a space filled with a gas generating agent 22 as described below. The top surface 2d is connected to the peripheral wall 2c at a first end side of the peripheral wall 2c, and a second end side thereof serves as an opening of the upper shell 2. Then, a mating wall 2a and an abutting section 2b are provided sequentially from the opening, on the second end side of the peripheral wall 2c. A radius of an internal space formed by the mating wall 2a is formed greater than a radius of an internal space formed by the peripheral wall 2c near the top surface 2d, and the mating wall 2a is connected to the peripheral wall 2c with the abutting section 2b therebetween.

Further, the lower shell 3 includes the peripheral wall 3a and the bottom surface 3b, which form an internal space having a concave shape. The internal space is a space filled with the gas generating agent 26 as described later. The bottom surface 3b is connected to the peripheral wall 3a at a first end side of the peripheral wall 3a, and a second end side thereof serves as an opening of the lower shell 3. Then, a radius of an internal space formed by the peripheral wall 3a is substantially the same as the radius of the internal space formed by the peripheral wall 2c of the upper shell 2. As illustrated in FIG. 2, the bottom surface 3b of the lower shell 3 is provided with a fitting hole 3c and a fitting hole 3d in which a first igniter 23 and a second igniter 27 are respectively fixed as described below.

Further, a partition wall member 10 is disposed in the housing 4 between the upper shell 2 and the lower shell 3. The partition wall member 10 includes a terminating end 15, a mating wall 14 extending from the terminating end 15 along the peripheral wall 3a of the lower shell 3, a dividing wall 13 that connects to the mating wall 14 and divides the inside of the housing 4 substantially into upper and lower spaces, a peripheral wall 12 that connects to the dividing wall 13 and extends to the bottom surface 3b of the lower shell 3, and an attachment edge 11 that connects to the peripheral wall 12 and to which the first igniter 23 is attached. As illustrated in FIG. 1, in a case that the terminating end 15 is placed on a terminating surface of the peripheral wall 3a of the lower shell 3 and the partition wall member 10 is attached to the housing 4, the dividing wall 13 forms a wall surface substantially parallel to the top surface 2d of the upper shell 2 and the bottom surface 3b of the lower shell 3, and the peripheral wall 12 is connected to the dividing wall 13, forming a space recessed from the wall surface of the dividing wall 13 toward the lower shell 3. Further, a through hole 10a is provided in the peripheral wall 12, and the through hole 10a communicates two spaces (a first space 21 and a second space 25 described below) formed by being divided by the partition wall member 10. Note that this recessed space opens toward the space above the recessed space and contains the first igniter 23 as described below, and is referred to as a "containment space by the peripheral wall 12". The attachment edge 11 forms a through hole through which the first igniter 23 fitted into the fitting hole 3c of the lower shell 3 is inserted. Note that in a case that the partition wall member 10 is attached to the lower shell 3, the attachment edge 11 comes into contact with the bottom surface of the bottom surface 3b near the fitting hole 3c, and the mating wall 14 of the partition wall member 10 is further mated with the peripheral wall 3a of the lower shell 3.

Then, with the partition wall member 10 attached onto the lower shell 3 in this manner, the upper shell 2 is further attached from above. As described above, the radius of the internal space formed by the mating wall 2a of the upper shell 2 is formed greater than the radius of the internal space formed by the peripheral wall 2c, and thus the upper shell 2 is fitted to the lower shell 3 until the abutting section 2b abuts against the terminating end 15 of the partition wall member 10. With the abutting section 2b of the upper shell 2 abutting against the terminating end 15, the mating wall 14 is mated with the peripheral wall 3a of the lower shell 3. Note that, in the housing 4, the contacting areas of the upper shell 2 and the lower shell 3 are joined by a joining method (for example, welding or the like) favorable for moisture-proofing the gas generating agent filled in the interior, or the like.

Thus, in the housing 4, the internal space is divided substantially vertically into two spaces by the partition wall member 10. Among the internal spaces of the housing 4, the first igniter 23, a container 40, and the gas generating agent 22 are disposed in the first space 21 (upper space) defined by the upper shell 2 and the partition wall member 10, and the second igniter 27 and a gas generating agent 26 are disposed in the second space 25 (lower space) defined by the lower shell 3 and the partition wall member 10, and thus the gas generator 1 is configured as a dual type gas generator including two igniters, namely, the first igniter 23 and the second igniter 27. Note that the first igniter 23 and the second igniter 27 are both fixed onto the bottom surface 3b of the lower shell 3. Thus, the first igniter 23 is contained in the containment space by the peripheral wall 12 such that sides of the first igniter 23 are surrounded by the peripheral wall 12 of the partition wall member 10, and a top section does not project from the dividing wall 13 connected to the peripheral wall 12.

Here, in the first space 21, the first igniter 23 is contained in the containment space by peripheral wall 12, and the space thereabove (substantially the space above the dividing wall 13) is filled with the gas generating agent 22, and a filter 32 having an annular shape is disposed surrounding the gas generating agent 22. At this time, the space is filled with the gas generating agent 22 in a state in which the gas generating agent 22 is pressed to the filter 32, the dividing wall 13, and the like by a biasing force of a cushion 31, and thus does not vibrate unnecessarily in the first space 21. The gas generating agent 22 used is a gas generating agent having a relatively low combustion temperature. Preferably, the combustion temperature of the gas generating agent 22 ranges from 1000 to 1700° C. and, for example, a monoporous cylindrical material made from guanidine nitrate (41 wt. %), basic copper nitrate (49 wt. %), and a binder or an additive may be used.

Note that the filter 32 is formed by overlapping a flat-knit wire mesh made from stainless steel in a radial direction and compressing the wire mesh in the radial direction and the axial direction, and is configured to cool the combustion gas resulting from the gas generating agent 22 and to filter combustion residue. Additionally, as the filter 32, a winding type structure formed by winding wire in multiple layers on a core rod may be used. Note that the filter 32 also filters the combustion residue of the gas generating agent 26 filled in the second space 25. Further, a gap 33 formed between the peripheral wall 2c of the upper shell 2 and the filter 32 forms a gas passage having an annular shape in a radial cross section around the filter 32. This gap 33 allows the combustion gas to pass through the entire region of the filter 32, which can achieve efficient use of the filter 32 and effective cooling and purification of the combustion gas. The combustion gas flowing through the gap 33 reaches a gas discharge port 5 provided in the peripheral wall 2c. Further, to prevent moisture from penetrating the housing 4 from outside, the gas discharge port 5 is blocked at the interior of the housing 4 by an aluminum tape 34 prior to actuation of the gas generator 1.

Next, the second space 25 is filled with the gas generating agent 26 in correspondence with the second igniter 27 fixed to the fitting hole 3d of the lower shell 3. At this time, the second space 25 is filled with the gas generating agent 26 in a state in which components are also biased by a buffering member (not illustrated) to prevent components from vibrating unnecessary in the second space 25. Further, similar to the gas generating agent 22, for the gas generating agent 26 as well, a monoporous cylindrical material made from guanidine nitrate (41 wt. %), basic copper nitrate (49 wt. %), and a binder or an additive may be used.

According to such a configuration, the gas generator 1 can generate a relatively large amount of combustion gas by the combustion of the gas generating agent 22 by actuation of the first igniter 23 and the combustion of the gas generating agent 26 by actuation of the second igniter 27 and discharge the combustion gas to the outside. However, in the gas generator 1, while the gas generating agent 22 is disposed in the space of a center section of the filter 32 having an annular shape and a center for a group of the gas generating agents 22 filled in the space substantially coincides with the center axis Z0 of the gas generator 1, the first igniter 23 and the second igniter 27 are disposed on the bottom surface 3b of the lower shell 3. A center axis in the height direction of the first igniter 23 disposed in the containment space by the peripheral wall 12 is thus shifted from the center axis Z0 of the gas generator 1. Therefore, in the first space 21 of the gas generator 1, the relative position of the first igniter 23 with respect to the gas generating agent 22 filled in the first space 21 is a position shifted from the center for the group of the gas generating agents 22. As a result, the combustion product discharged in the direction along the center axis Z0 by actuation of the first igniter 23 is discharged toward a position shifted from a substantial center for the group of the gas generating agents 22 filled in the first space 21, causing unevenness in the combustion of the gas generating agent 22 and possibly resulting in deviation of the output characteristics of the gas generator 1 from expectations.

Figure 3A:
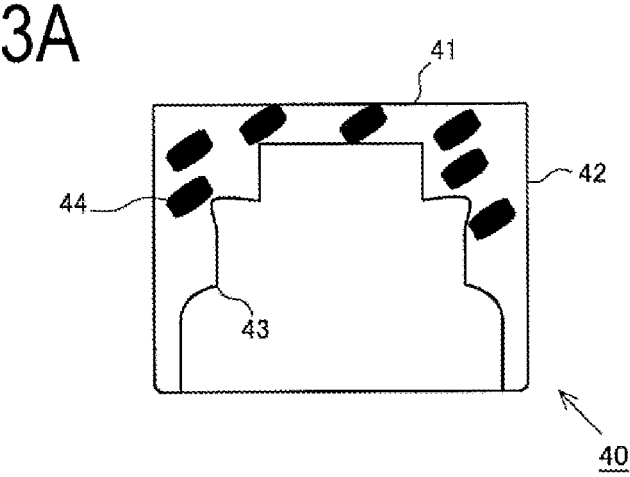
FIG. 3A is a diagram illustrating a schematic configuration of a container incorporated into the gas generator illustrated in FIG. 1.
Figure 3B:
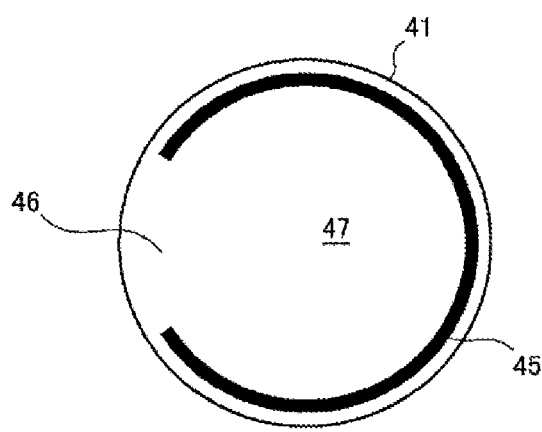
FIG. 3B is a diagram illustrating a schematic configuration of a container incorporated into the gas generator illustrated in FIG. 1.

Here, in the gas generator 1, in the first space 21, a container 40 containing a predetermined transfer charge is disposed between the first igniter 23 contained in the containment space by the peripheral wall 12 and the gas generating agent 22 filled in the first space 21. As illustrated in FIG. 3A and FIG. 3B, the container 40 is a container including a containment space for containing a transfer charge 44 in the interior thereof. FIG. 3A illustrates a cross section of the container 40, and FIG. 3B is a top view of the container 40. As the transfer charge 44, a gas generating agent having good ignitability and a combustion temperature higher than those of the gas generating agents 22, 26 can be used. Preferably, the combustion temperature of the transfer charge 44 ranges from 1700 to 3000° C. Examples of such a transfer charge 44 include a disc material made from nitroguanidine (34 wt. %) and strontium nitrate (56 wt. %).

The container 40 includes a lid 41 having a circular shape and a peripheral wall 42. While the outer appearance of the container 40 is substantially cylindrical, a bottom surface 43 thereof has a shape corresponding to the outer shape of the first igniter 23 that comes into contact with the bottom surface 43 in the arranged state of the gas generator 1 illustrated in FIG. 1. In a case that the first igniter 23 is actuated, the bottom surface 43 of the container 40 is ruptured, and the transfer charge 44 therein is burned. Note that, in the arranged state of the gas generator 1 illustrated in FIG. 1, the lid 41 of the container 40 has about the same height as the wall surface of the dividing wall 13, and is adjacent to the gas generating agent 22 positioned above. Further, the peripheral wall 42 is in a state facing the inner wall surface of the containment space defined by the peripheral wall 12 of the partition wall member 10.

In such a container 40, the lid 41 is fixed to the peripheral wall 42 and seals the interior of the container 40 prior to actuation of the first igniter 23. As a result, the transfer charge 44 can be sufficiently protected from external moisture. Furthermore, as illustrated in FIG. 3B, the lid 41 is provided with a notch 45 such that an area where the notch 45 is formed is thinner than other areas of the lid 41. The notch 45 is formed in an arc shape having a center angle of about 300 degrees near a peripheral edge of the lid 41 (the area where the lid 41 is connected to the peripheral wall 42). Thus, in an area 46 near the peripheral edge of the lid 41 where the notch 45 does not extend, the thickness of the lid 41 is increased, increasing the strength of the area 46 compared to that in the area where the notch 45 is formed. Thus, the area 46 corresponds to a strong connection section of the invention of the present application, and the notch 45 corresponds to a frangible section of the invention of the present application.

Figure 4:
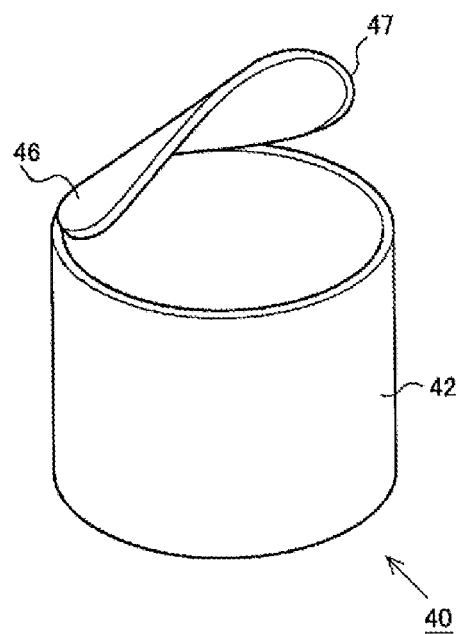
FIG. 4 is a diagram illustrating a state in a case that an igniter is actuated in the gas generator illustrated in FIG. 1.

Since areas differing in strength with each other are thus provided by the notch 45 and the area 46 on the lid 41, in a case that the transfer charge 44 in the container 40 burns and the internal pressure rises, as illustrated in FIG. 4, in the lid 41, a lid element 47, which is a portion of the lid 41 substantially surrounded by the notch 45, is maintained in a connected state to the body side (peripheral wall 42 side) of the container 40 while the area where the notch 45 is formed is ruptured. A state in which the container 40 is thus open while the lid element 47 is connected to the body side of the container 40 is referred to as a "half open state". In a case that the lid element 47 is in the half open state, the combustion product generated by the transfer charge 44 inside the container 40 is discharged along the lid element 47 to the side where the lid element 47 is largely open. Further, in a case that an inclination of the lid element 47 (inclination of the lid element 47 in the half open state relative to the position of the lid 41 before combustion of the transfer charge 44) changes in response to the pressure inside the container 40, the orientation of the discharge of the combustion product from the container 40 also changes depending on the inclination.

Figure 5:
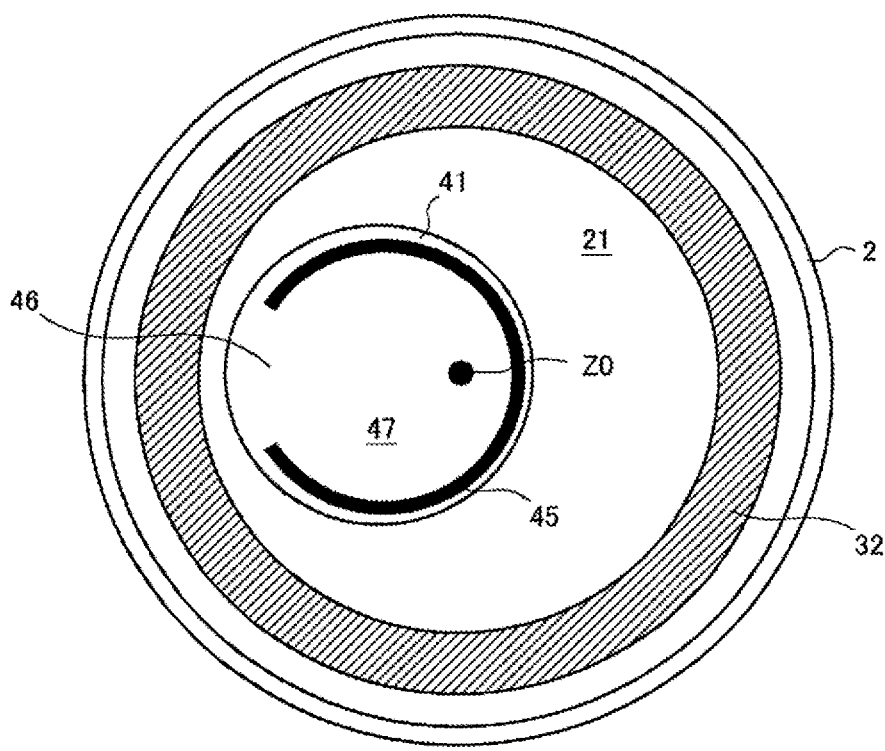
FIG. 5 is a diagram illustrating an arrangement of the container of the gas generator illustrated in FIG. 1.

As illustrated in FIG. 1, the container 40 thus configured is disposed above the first igniter 23 in the first space 21. The relative positional relationship between the container 40 and the first space 21 in the upper shell 2 at this time is illustrated in FIG. 5. FIG. 5 is a view of the first space 21 as viewed from above. The container 40 is positioned above the first igniter 23 with the area 46 of the lid 41 positioned on the side (left side in FIG. 5) opposite to or farthest from the center axis Z0 of the gas generator 1. Note that the container 40 is substantially circular in a top view, and therefore a hook area that inhibits rotation may be provided between the container 40 and the first igniter 23 to prevent rotation on the first igniter 23 after the first igniter 23 is arranged. Further, alternatively, a shift in position of the container 40 after the above-described arrangement can also be prevented by making the peripheral wall 12 of the partition wall member 10 have an elliptical cross-sectional shape, and making the container 40 also have an elliptical shape corresponding thereto.

Figure 6:
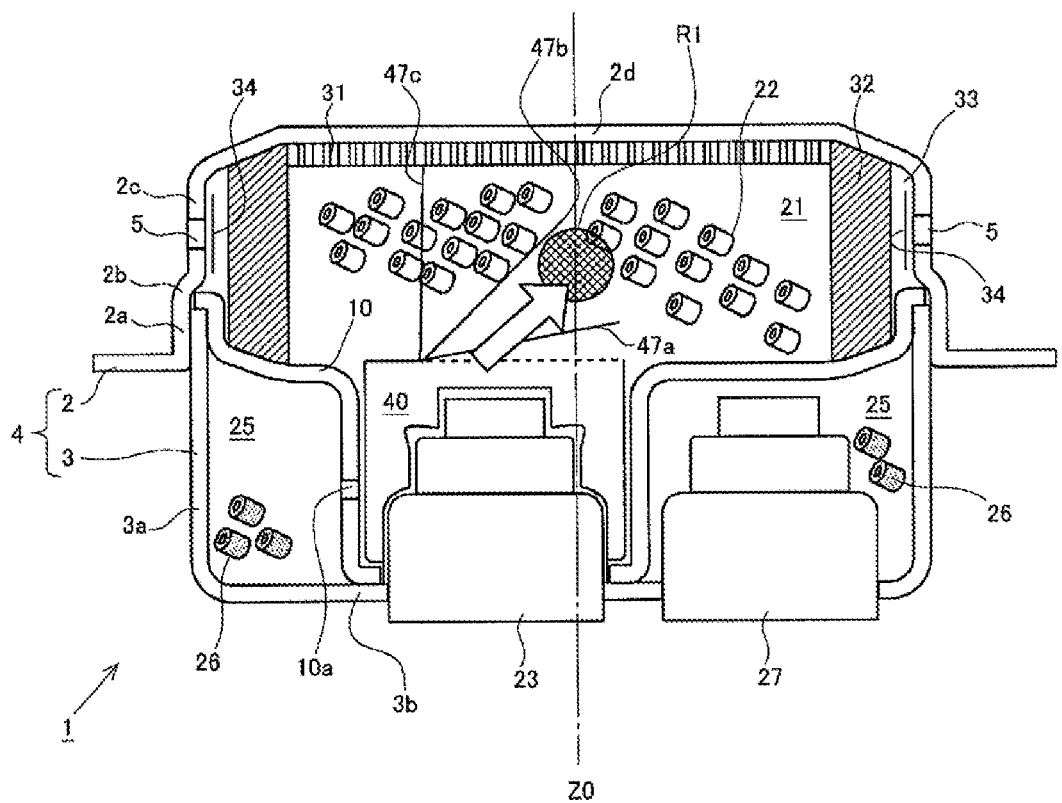
FIG. 6 is a diagram illustrating a state of a container in a case that an igniter is actuated.

In a case that the first igniter 23 is actuated with the container 40 positioned relative to the first igniter 23 as illustrated in FIG. 5, the pressure inside the container 40 rises and the notch 45 of the lid 41 ruptures. As a result, the lid element 47 of the lid 41 is in the half open state as illustrated in FIG. 6 and, at this time, is largely open toward an area R1 at the substantial center for the group of gas generating agents 22 filled in the first space 21 (the area R1 is a region substantially on the center axis Z0 of the gas generator 1 and corresponds to the predetermined combustion start area of the invention of the present application). As a result, the combustion product resulting from the transfer charge 44 is discharged toward the gas generating agent 22 along the lid element 47 in the half open state, and thus the gas generating agent 22 can substantially start combustion from the area R1 at the center, making it possible to suppress an unevenness in the combustion of the gas generating agent 22 to the extent possible.

Note that, before actuation of the first igniter 23, the lid element 47 of the container 40 is not open, and an opening surface area thereof increases as the internal pressure rises. In particular, in the early stages of combustion of the transfer charge 44, the combustion of the gas generating agent 22 does not proceed and the amount of the gas generating agent 22 remaining in the first space 21 is large, making the lid element 47 difficult to open. Thus, in the state immediately after the lid element 47 is opened (the state of the lid element denoted by reference numeral 47a in FIG. 6), the inclination of the lid element 47 is relatively small, and the opening direction is not directed to the area R1. However, in such a state, the amount of combustion product discharged from the container 40 is also relatively small, which does not trigger the combustion of a large amount of gas generating agent 22. Subsequently, when the lid element 47 is further pressed upward as combustion of the transfer charge 44 proceeds and reaches the state denoted by reference numeral 47b in FIG. 6, a sufficient amount of combustion product which can trigger the combustion of the large amount of gas generating agent 22 is discharged along the lid element 47 toward the area R1, making it possible to achieve a favorable start of combustion of the gas generating agent 22. In this manner, positions, sizes, shapes, and the like of the notch 45 and the area 46 of the lid 41 of the container 40 are designed in such a manner that ensures that the lid element 47 in the half open state is directed toward the area R1 at a timing at which the amount of the combustion product resulting from the transfer charge 44 is suitable for the combustion of the gas generating agent 22.

Note that, as the combustion of the transfer charge 44 further proceeds, the inclination of the lid element 47 is further increased, causing the lid element 47 to reach the state denoted by reference number 47c in FIG. 6. However, the combustion of the gas generating agent 22 has already proceeded to a certain degree at this time, thus the effect on the combustion of the gas generating agent 22 can be sufficiently ignored.

As described above, in the gas generator 1 according to the present example, in a case that the first igniter 23 is actuated, the transfer charge 44 inside the container 40 is first burned. The combustion product generated by the combustion causes the lid element 47, which is a portion of the lid 41 of the container 40, to be in a half open state, making it possible for the combustion product to be favorably discharged to the area R1 of the gas generating agent 22 filled the first space 21, and thus achieve uniform combustion of the gas generating agent 22. The combustion gas generated by the combustion of the gas generating agent 22 is discharged from the gas discharge port 5 to outside the housing 4. Furthermore, after actuation of the first igniter 23, when the second igniter 27 is actuated, the gas generating agent 26 filled in the second space 25 is burned. The combustion gas generated by that combustion passes through the through hole 10a, ruptures the peripheral wall 42 of the container 40, flows into the first space 21, and is further discharged from the gas discharge port 5 to outside the housing 4. The actuation timing of the first igniter 23 and the second igniter 27 may be appropriately determined, depending on the output characteristics of the gas generator 1.

Modified Example 1

Figure 7:
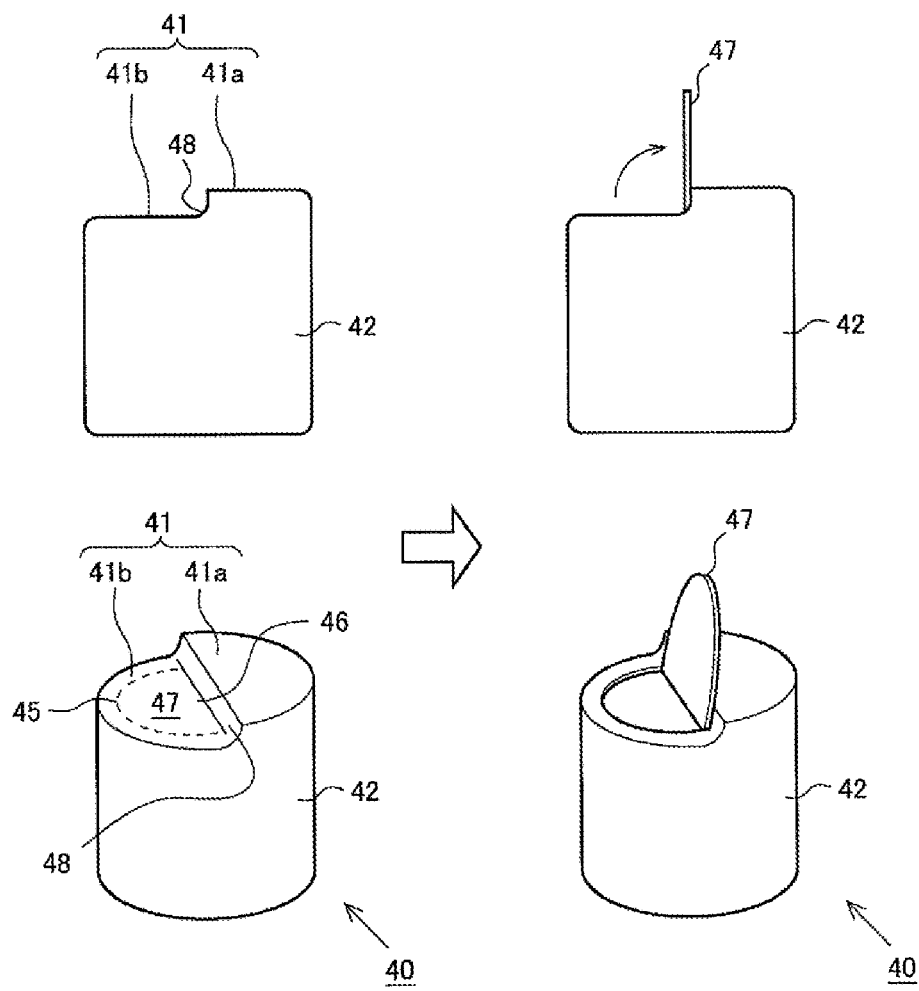
FIG. 7 is a first drawing illustrating a different mode of a container according to an embodiment of the present invention.

Modified Example 1 of the container 40 applicable to the gas generator 1 will be described on the basis of FIG. 7. FIG. 7 illustrates the container 40 prior to actuation of the first igniter 23 on the left side and the container 40 after the first igniter 23 is actuated on the right side. The container 40 illustrated in FIG. 7 differs from the container 40 of the example described above in the configuration of the lid 41. Specifically, a step 48 is provided on the lid 41. An upper side of the lid 41 is an upper lid section 41a, and a lower side of the lid 41 is a lower lid section 41b. Furthermore, the notch 45 is provided in a substantially semi-circular shape in the lower lid section 41b. Both ends of the notch 45 are extended to near the step 48, and thus the area 46 having a greater strength than that of the area where the notch 45 is formed is an area near the step 48 and corresponds to the strong connection section of the invention of the present application. Note that, although not illustrated in FIG. 7, the bottom surface of the container 40 has a shape corresponding to the shape of the first igniter 23 positioned below, similar to that in the above example.

In the container 40 thus configured, in a case that the first igniter 23 is actuated, the transfer charge inside the container 40 is burned, and the lid element 47, which is a portion of the lower lid section 41b, is in the half open state, thereby allowing discharge of the combustion product resulting from the transfer charge along the lid element 47. Note that, in a case that the lid element 47 of the present modified example is inclined a certain degree, the lid element 47 comes into contact with the step 48, and the inclination reaches a structurally limited state (the state illustrated on the right side in FIG. 7). As long as the direction in which the combustion product is directed by the lid element 47 in the half open state is in the direction toward the area R1 illustrated in FIG. 6 at this time, the combustion product can be more favorably guided to the area R1, and the gas generating agent 22 can be more effectively uniformly burned.

Further, although not illustrated in FIG. 7, a configuration in which a protrusion that comes into contact with the step 48 in the half open state is provided on the lid element 47 may be employed. The inclination of the lid element 47 in a case that the lid element 47 comes into contact with the step 48 can be adjusted by adjusting the size of the protrusion. As a result, the container 40 is easily formed in such a manner that ensure that the combustion production resulting from the transfer charge effectively reaches the area R1 favorable for combustion of the gas generating agent 22.

Modified Example 2

Figure 8:
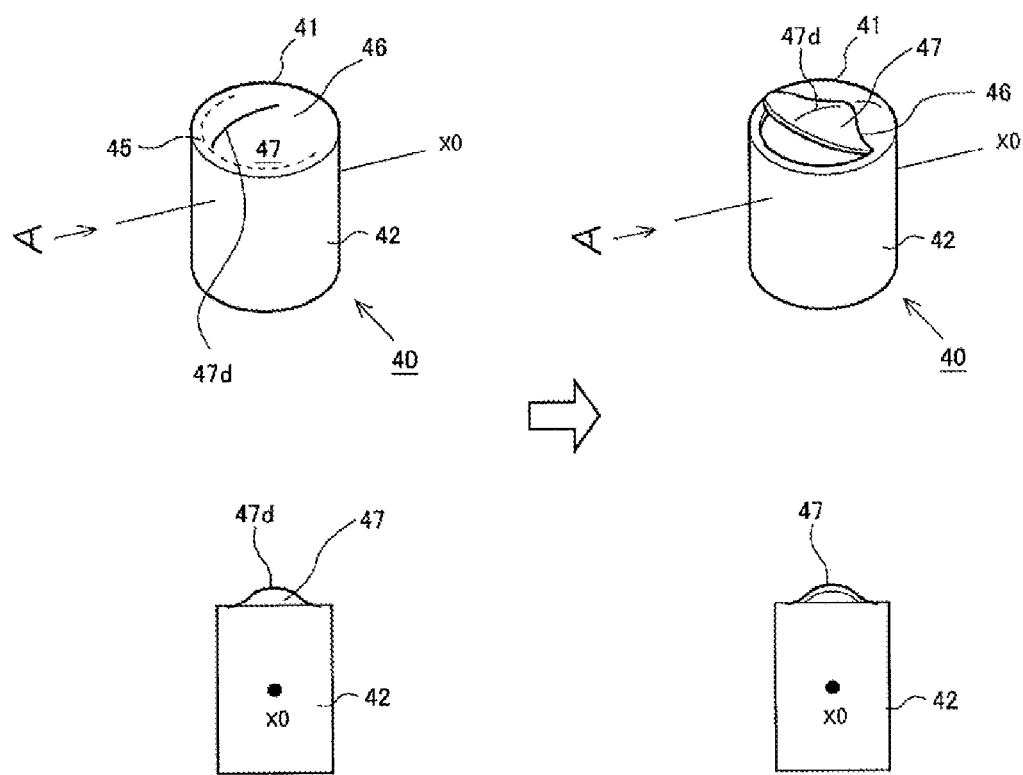
FIG. 8 is a second drawing illustrating a different mode of a container according to an embodiment of the present invention.

Modified Example 2 of the container 40 applicable to the gas generator 1 will be described on the basis of FIG. 8. FIG. 8 illustrates the container 40 prior to actuation of the first igniter 23 on the left side and the container 40 after the first igniter 23 is actuated on the right side. The container 40 illustrated in FIG. 8 differs from the container 40 of the example described above in the configuration of the lid 41. Specifically, a rib 47d formed by increasing the thickness of the lid 41 in an area serving as the lid element 47 of the lid 41 or by deforming a portion of the lid 41 into a convex shape is provided. The notch 45 in the present modified example is also provided in a substantially semi-circular shape, and the rib 47d has a shape extending from a substantial intermediate point of both ends of the notch 45 toward a center section of the notch 45. Thus, when viewed from an axis X0 along an extending direction of the rib 47d, the lid element 47 is raised as illustrated in the lower drawing on the left side in FIG. 8 and a first end of the rib 47d is positioned closer to the area 46 having a greater strength than the area where the notch 45 is formed. Note that, although not illustrated in FIG. 8, the bottom surface of the container 40 has a shape corresponding to the shape of the first igniter 23 positioned below, similar to that in the above example.

In the container 40 thus configured, in a case that the first igniter 23 is actuated, the transfer charge inside the container 40 is burned, and the lid element 47, which is a portion of the lid 41, is in the half open state, thereby allowing discharge of the combustion product resulting from the transfer charge along the lid element 47. Note that, in the present modified example, the rib 47d is provided on the lid element 47 along the axis X0, and thus a rigidity of the lid element 47 is increased and relatively small degree of inclination for the lid element 47 can be stably made in a case that the lid element 47 is in the half open state. Here, as long as the combustion product resulting from the transfer charge can be directed to the area R1 of the gas generating agent 22 by the inclination of such a lid element 47, the container 40 according to the present modified example is considered to be in a very useful form.

Modified Example 3

Figure 9A:
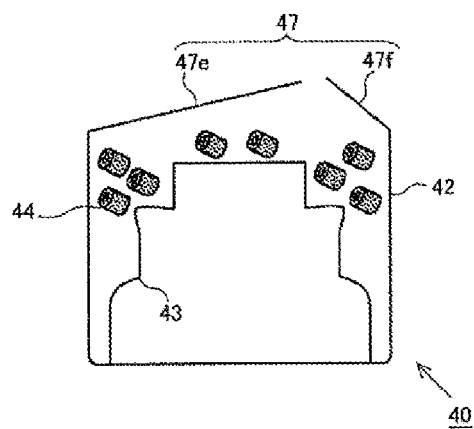
FIG. 9A is a third drawing illustrating a different code of a container according to an embodiment of the present invention.
Figure 9B:
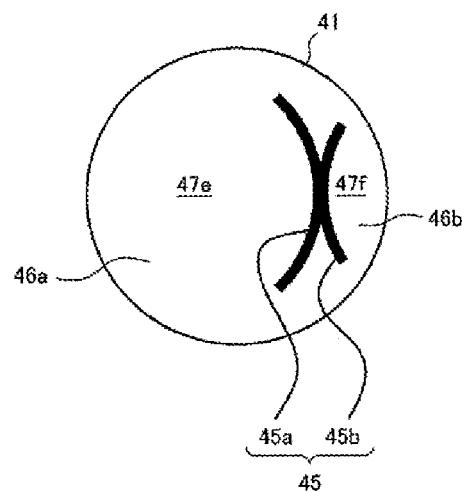
FIG. 9B is a third drawing illustrating a different mode of a container according to an embodiment of the present invention.
Figure 9C:
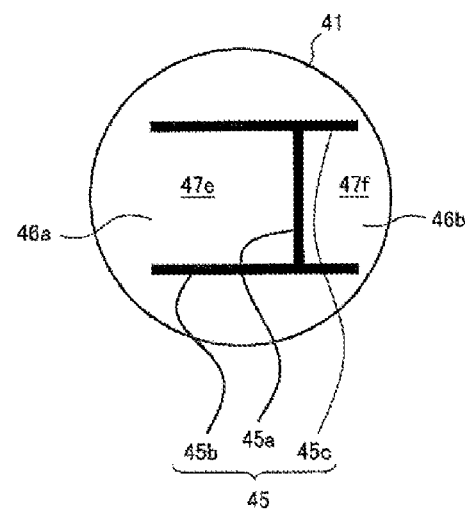
FIG. 9C is a third drawing illustrating a different mode of a container according to an embodiment of the present invention.

Modified Example 3 of the container 40 applicable to the gas generator 1 will be described on the basis of FIG. 9A FIG. 9C. The container 40 illustrated in FIG. 9A-FIG. 9C is configured as follows. The transfer charge in the container 40 is burned by actuation of the first igniter 23, and the lid element 47 becomes a double open state as illustrated in FIG. 9A. The lid element 47 in such a double open state controls a direction the discharge of the combustion product resulting from the transfer charge. In the lid element 47 at this time, a first lid element 47e serves as one lid element, and a second lid element 47f serves as another lid element. A double open state is formed by both the lid elements. That is, the double open state is formed by the respective lid elements being in the half open state, facing each other.

Even in a case where the lid element 47 is thus in the double open state, the flow of the combustion product is regulated by the respective lid elements 47e, 47f, and thus the direction of discharge from the container 40 is determined in any direction. By favorably forming one lid element (first lid element 47e) larger than the other lid element (second lid element 47f) and adjusting the size ratio, the discharge direction of the combustion product from the container 40 can be adjusted.

Modes of the lid 41 of the container 40 for achieving such a double open state of the lid element 47 are illustrated in FIG. 9B and FIG. 9C. In the example in FIG. 9B, a notch 45a having an arc shape and defining the first lid element 47e and a notch 45b having an arc shape and defining the second lid element 47f are provided in the lid 41. A strong connection section corresponding to the first lid element 47e is denoted by 46a, and a strong connection section corresponding to the second lid element 47f is denoted by 46b. The notch 45a and the notch 45b are provided in the lid 41 substantially in contact with each other at the center sections thereof, with a surface area of the first lid element 47e being greater than a surface area of the second lid element 47f.

Further, in the example in FIG. 9C illustrating a different mode, three notches 45a, 45b, 45c defining the first lid element 47e and a second lid element 47f are provided in the lid 41. These three notches form the notch 45 having an H shape as illustrated in the drawing. A region interposed between the notch 45b and the notch 45c serves as the lid element 47 and, in that region, the first lid element 47e and the second lid element 47f are defined by the notch 45a, with the surface area of the first lid element 47e greater than the surface area of the second lid element 47f. Then, a strong connection section corresponding to the first lid element 47e is denoted by 46a, and a strong connection section corresponding to the second lid element 47f is denoted by 46b.

Modified Example 4

Figure 10:
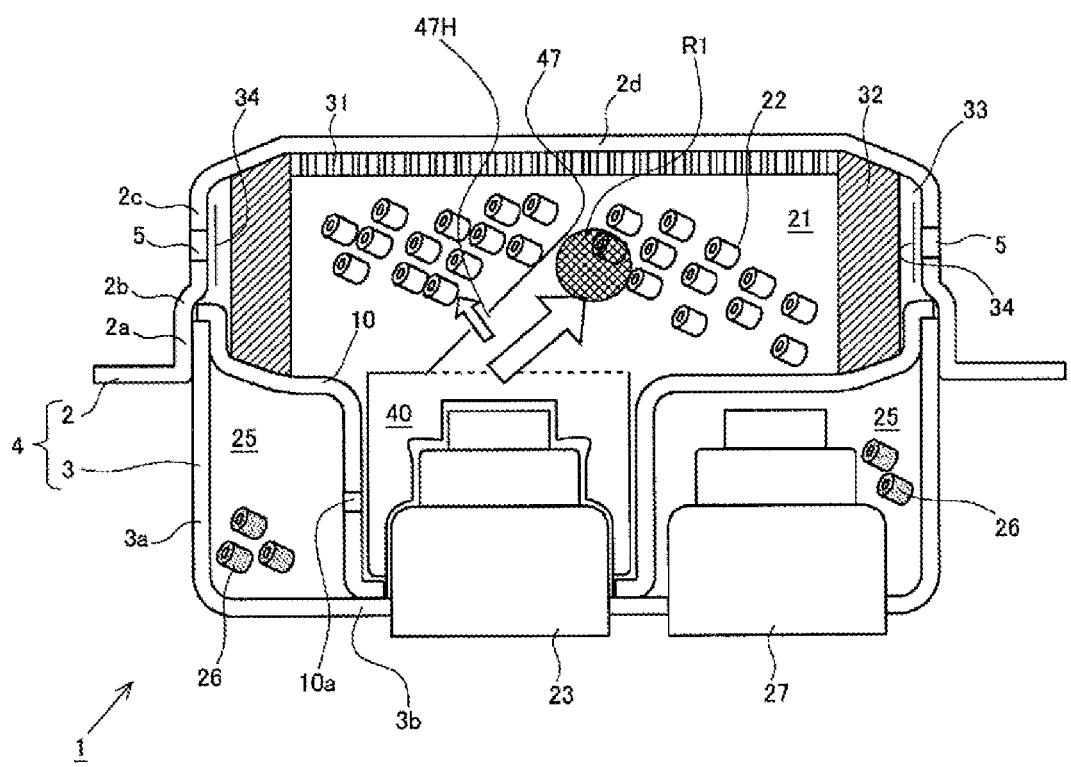
FIG. 10 is a second drawing illustrating a schematic configuration of a gas generator according to an embodiment of the present invention.

Modified Example 4 of the container 40 applicable to the gas generator 1 will be described on the basis of FIG. 10. The gas generator 1 of the present modified example differs from the example described above in that a through hole 47H is provided in the lid element 47 of the container 40. In a case that the transfer charge 44 inside the container 40 burns by actuation of the first igniter 23, and the lid element 47 is in the half open state, the combustion product resulting from the transfer charge 44 can be directed to the area R1 of the gas generating agent 22, as illustrated in the above example. At this time, a portion of the combustion product flowing along the lid element 47 burns a portion of the gas generating agent 22 positioned on the immediate backside of the lid element 47 through the through hole 47H. In a case that the lid element 47 is in the half open state, uniform combustion of the gas generating agent positioned on the immediate back side of the lid element 47 may be inhibited because the gas generating agent is positioned on a back side of the lid element 47, the back side being a side opposite to an area where combustion of the gas generating agent started from the area R1 proceeds. Here, as in the present modified example, a portion of the combustion product resulting from the transfer charge 44 is carried to the immediate backside of the lid element 47 through the through hole 47H, making it possible to more favorably uniformly burn the gas generating agent 22 filled in the first space 21. Note that the position of the immediate backside of the lid element 47 corresponds to an additional combustion area of the invention of the invention of the present application.

Example 2

Figure 11:
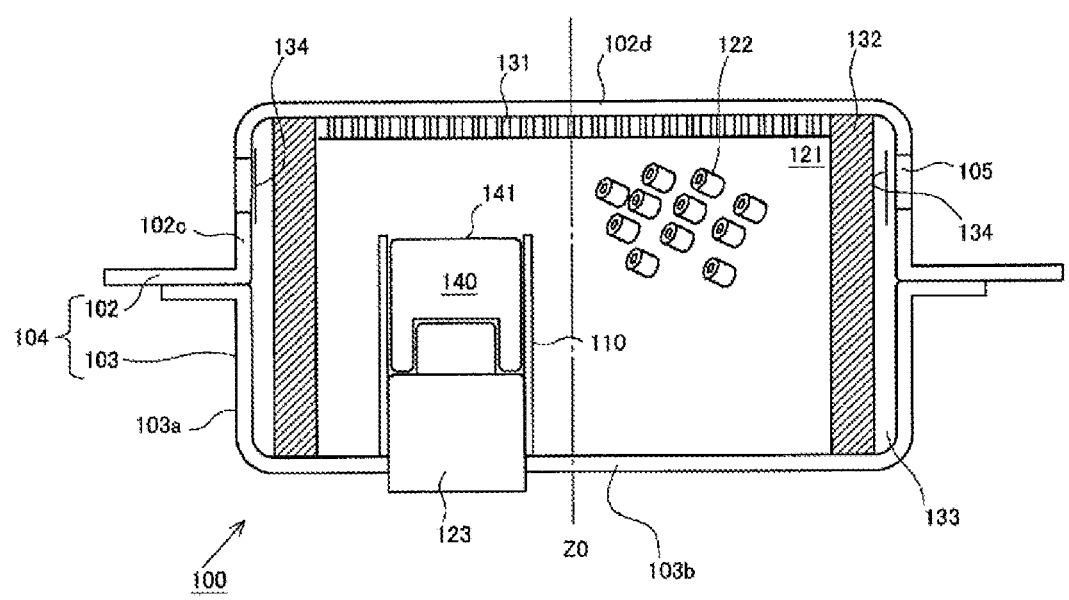
FIG. 11 is a third drawing illustrating a schematic configuration of a gas generator according to an embodiment of the present invention.

The gas generator 1 of Example 2 will be described on the basis of FIG. 11. FIG. 11 is a cross-sectional view in the height direction of a gas generator 100 of the present example. Note that Z0 in FIG. 11 represents a center axis in a height direction (axial direction) of the gas generator 100. The gas generator 100 is configured to burn a gas generating agent filled in a housing 104 formed by an upper shell 102 and a lower shell 103, and externally discharge a combustion gas through a gas discharge port 105 provided in the upper shell 102. The upper shell 102 includes a peripheral wall 102c and a top surface 102d, which form an internal space having a concave shape. Further, the lower shell 103 includes a peripheral wall 103a and a bottom surface 103b, which form an internal space having a concave shape. The top surface 102d and the bottom surface 103b of the lower shell 103 described below, have a substantially circular shape in a top view, and the peripheral wall 102c and the peripheral wall 103a of the lower shell 103 described below surround the top surface 102d and the bottom surface 103b, respectively, and form an annular wall surface extending substantially vertically from each surface. The top surface 102d is connected to a first end side of the peripheral wall 102c, and a second end side thereof serves as an opening of the upper shell 102. The bottom surface 103b is connected to a first end side of the peripheral wall 103a, and a second end side thereof serves as an opening of the lower shell 103.

Then, an internal space 121 of the housing 104 is filled with a gas generating agent 122, and an igniter 123 for combustion thereof is disposed on the bottom surface 103b. Furthermore, a filter 132 having an annular shape is disposed in the internal space 121 so as to surround the gas generating agent 122. The filter 132 is formed by overlapping a flat-knit wire mesh made from stainless steel in a radial direction and compressing the wire mesh in the radial direction and the axial direction, and is configured to cool the combustion gas resulting from the gas generating agent 122 and to filter combustion residue. At this time, the internal space 121 is filled with the gas generating agent 122 in a state in which the gas generating agent 122 is pressed to the filter 132, the bottom surface 103b, and the like by a biasing force of a cushion 131, and thus does not vibrate unnecessarily in the first space 121. Further, for the gas generating agent 122, for example, a single-perforated cylindrical material made from guanidine nitrate (41 wt. %), basic copper nitrate (49 wt. %), and a binder or an additive may be used.

Further, a gap 133 formed between the peripheral wall 102c of the upper shell 102 and the filter 132 forms a gas passage having an annular shape in a radial cross section around the filter 132. Further, the gas discharge port 105 is blocked at the interior of the housing 104 by an aluminum tape 34 and moisture is kept from penetrating the housing 104 prior to actuation of the gas generator 100.

In this manner, the gas generator is a single type gas generator including one igniter. The gas generator 100 can generate combustion gas by the combustion of the gas generating agent 122 by actuation of the igniter 123 and discharge the generated gas to the outside. However, in the gas generator 100, while the gas generating agent 122 is disposed in a space of a center section of the annular filter 132 and a center for a group of the gas generating agents 122 filled in the space substantially coincides with the center axis Z0 of the gas generator 100, the igniter 123 is disposed on the bottom surface 3b of the lower shell 3 in a position shifted from the center axis Z0 of the gas generator 100 for predetermined reasons. Therefore, in the internal space 121 of the gas generator 100, the relative position of the igniter 123 with respect to the gas generating agent 122 filled in the internal space 121 is a position shifted from the center for the group of the gas generating agents 122. As a result, the combustion product discharged by actuation of the first igniter 123 is discharged in a direction along the center axis Z0 at a position shifted from a substantial center for the group of the gas generating agents 122 filled in the internal space 121, causing unevenness in the combustion of the gas generating agent 122 and possibly resulting in deviation of the output characteristics of the gas generator 100 from expectations.

Here, even in the gas generator 100, in the internal space 121, a container 140 containing a predetermined transfer charge is disposed between the igniter 123 and the gas generating agent 122 filled in the internal space 121. The container 140 is a container for containing a transfer charge in the interior thereof, and is substantially the same as the container 40 described in Example 1, and thus detailed description thereof is omitted. To burn the transfer charge in the container 140 by actuation of the igniter 123, the container 140 is disposed on the igniter 123. At this time, to efficiently rupture a lid 141 of the container 140, a partition wall member 110 having a cylindrical shape and opening toward the internal space 121 is provided on the bottom surface 103b to surround side sections of the igniter 123. Furthermore, the container 140 is also contained in the interior of the partition wall member 110, and a height of the partition wall member 110 is set with the lid 141 of the container 140 positioned substantially at the same height as an end of the partition wall member 110. As a result, the lid 141 is disposed adjacent to the gas generating agent 122.

Thus, the gas generator 100 is configured in such a manner that the igniter 123 and the container 140 are disposed overlapping in the interior of the partition wall member 110 and, as illustrated in FIG. 6, a portion of the lid 141 of the container is brought to the half open state by actuation of the igniter 123, allowing discharge of the combustion product resulting from the transfer charge to be directed toward an area (an area corresponding to the area R1 in FIG. 6) at the substantial center of the gas generating agent 122. As a result, even in a case where the igniter 123 is disposed at a position shifted from the center of the gas generating agent 122 in the single type gas generator 100, it is possible to achieve uniform combustion of the gas generating agent 122.

REFERENCE SIGNS LIST 1, 100 Gas generator
2, 102 Upper shell
3, 103 Lower shell
4, 104 Housing
5, 105 Gas discharge port
10, 110 Partition wall member
12 Peripheral wall
13 Dividing wall
14 Mating wall
21, 121 First space
22, 122, 126 Gas generating agent
23 First igniter
25 Second space
27 Second igniter
40, 140 Container
41 Lid
42 Peripheral wall
43 Bottom surface
44 Transfer charge
45 Notch
46 Area
47 Lid element
47H Through hole
141 Lid
R1 Area

What is claimed is:

1. A gas generator comprising:
an igniter;
a container including a container body and a lid formed relative to the container body and configured to contain a transfer charge, the container being positioned relative to the igniter to allow combustion of the transfer charge by actuation of the igniter disposed outside the container; and
a housing configured to contain the igniter and the container, a predetermined region in the housing adjacent to the lid of the container being filled with a gas generating agent to be burned by a combustion product of the transfer charge burned by actuation of the igniter,
wherein the lid includes a frangible section configured to be capable of being ruptured by pressure applied by a combustion product generated by
combustion of the transfer charge and
a strong connection section configured to be capable of maintaining a connected state with the container body even in a case that pressure is applied by the combustion product,
the lid is configured such that in a case that the transfer charge is burned by actuation of the igniter, the frangible section is ruptured, and a portion or an entirety of the lid in a state of being connected to the container body with the strong connection section regulates discharge of the combustion product generated by the combustion of the transfer charge in a direction toward a predetermined combustion start area of the gas generating agent filled in the housing, and the container is positioned in the housing, offset from a center axis of the gas generator, with the strong connection section positioned on the side opposite to or farthest from a center axis of the gas generator.

2. The gas generator according to claim 1, wherein a discharge opening of the combustion product of the transfer charge formed by the portion or the entirety of the lid increases in size as combustion of the transfer charge proceeds, and the combustion product of the transfer charge is guided to the predetermined combustion start area by the portion or the entirety of the lid during a predetermined combustion period in a combustion process of the transfer charge.

3. The gas generator according to claim 1, wherein the lid further includes a through hole provided to allow a portion of the combustion product of the transfer charge burned by actuation of the igniter to reach an additional combustion area positioned on a backside of the lid and different from the predetermined combustion start area of the gas generating agent filled in the housing.

4. The gas generator according to claim 1, wherein the igniter is disposed on a bottom surface side of the housing, the housing includes a partition wall member provided such that the partition wall member surrounds the igniter and contains the igniter in an interior of the partition wall member, and such that the partition wall member includes an opening toward the gas generating agent filled in the housing, and the container is disposed, in an interior of the partition wall member, with a bottom side thereof adjacent to the igniter, a peripheral wall thereof facing an inner wall surface of the partition wall member, and the lid being configured to be oriented toward the gas generating agent through the opening of the partition wall member.

5. The gas generator according to claim 4, wherein the partition wall member is configured to divide an internal space of the housing into an upper space and a lower space, a space inside the upper space on an upper side of the igniter disposed on the bottom surface side of the housing is filled with the gas generating agent, and another igniter different from the igniter is disposed on the bottom surface side of the housing in the lower space, and the lower space is filled with another gas generating agent different from the gas generating agent and configured to be burned by actuation of the other igniter.

6. A container configured to contain a transfer charge, comprising:

a container body; and a lid formed relative to the container body, the transfer charge contained being burned by actuation of an igniter disposed outside the container, wherein the lid includes a frangible section configured to be capable of being ruptured by pressure applied by a combustion product generated by combustion of the transfer charge, and a strong connection section configured to be capable of maintaining a connected state with the container body even in a case where pressure is applied by the combustion product, and the lid is configured such that, in a case that the transfer charge is burned by actuation of the igniter, the frangible section is ruptured and a portion or an entirety of the lid in a state of being connected to the container body with the strong connection section regulates discharge of the combustion product generated by combustion of the transfer charge in a direction toward a predetermined combustion start area of the gas generating agent positioned outside the container and different from the transfer charge, and the container is for a gas generator and is positioned in a housing, offset from a center of the gas generator with the strong connection section positioned on the side opposite to or farthest from the center of the gas generator.

7. The gas generator according to claim 2, wherein the lid further includes a through hole provided to allow a portion of the combustion product of the transfer charge burned by actuation of the igniter to reach an additional combustion area positioned on a backside of the lid and different from the predetermined combustion start area of the gas generating agent filled in the housing.

8. The gas generator according to claim 2, wherein the igniter is disposed on a bottom surface side of the housing, the housing includes a partition wall member provided such that the partition wall member surrounds the igniter and contains the igniter in an interior of the partition wall member, and such that the partition wall member includes an opening toward the gas generating agent filled in the housing, and the container is disposed, in an interior of the partition wall member, with a bottom side thereof adjacent to the igniter, a peripheral wall thereof facing an inner wall surface of the partition wall member, and the lid being configured to be oriented toward the gas generating agent through the opening of the partition wall member.

9. The gas generator according to claim 3, wherein the igniter is disposed on a bottom surface side of the housing, the housing includes a partition wall member provided such that the partition wall member surrounds the igniter and contains the igniter in an interior of the partition wall member, and such that the partition wall member includes an opening toward the gas generating agent filled in the housing, and the container is disposed, in an interior of the partition wall member, with a bottom side thereof adjacent to the igniter, a peripheral wall thereof facing an inner wall surface of the partition wall member, and the lid being configured to be oriented toward the gas generating agent through the opening of the partition wall member.

* * * * *